United States Patent
Venkatesan et al.

(10) Patent No.: US 11,916,804 B2
(45) Date of Patent: Feb. 27, 2024

(54) QOS MODEL FOR SUPPORTING LOW LATENCY SERVICES AND TIME-SENSITIVE NETWORKING

(71) Applicant: Intel Corporation, Santa Clara, CA (US)

(72) Inventors: Ganesh Venkatesan, Hillsboro, OR (US); Dave Cavalcanti, Portland, OR (US); Dibakar Das, Hillsboro, OR (US); Nevo Idan, Zichron Ya'akov (IL); Chittabrata Ghosh, Fremont, CA (US); Ofer Hareuveni, Haifa (IL); Daniel Bravo, Portland, OR (US); Danny Alexander, Neve Efraim Monoson (IL)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 17/336,120

(22) Filed: Jun. 1, 2021

(65) Prior Publication Data

US 2021/0288915 A1    Sep. 16, 2021

Related U.S. Application Data

(60) Provisional application No. 63/032,988, filed on Jun. 1, 2020.

(51) Int. Cl.
*H04L 12/863*    (2013.01)
*H04L 47/62*    (2022.01)
*H04L 47/24*    (2022.01)

(52) U.S. Cl.
CPC .......... *H04L 47/6215* (2013.01); *H04L 47/24* (2013.01); *H04L 47/622* (2013.01)

(58) Field of Classification Search
CPC .... H04L 47/24; H04L 47/6215; H04L 47/622
USPC .......................................................... 370/329
See application file for complete search history.

(56) References Cited

U.S. PATENT DOCUMENTS

| | | | |
|---|---|---|---|
| 11,405,958 B2* | 8/2022 | Xin | H04W 28/0268 |
| 2002/0126675 A1* | 9/2002 | Yoshimura | H04L 47/2433 370/477 |
| 2011/0013513 A1* | 1/2011 | Lai | H04L 47/2441 370/235 |
| 2012/0127874 A1* | 5/2012 | Oh | H04W 4/46 370/252 |
| 2020/0366621 A1* | 11/2020 | Flomen | H04L 65/1073 |
| 2021/0076420 A1* | 3/2021 | Xin | H04L 45/74 |
| 2021/0195683 A1* | 6/2021 | Xin | H04W 4/80 |
| 2021/0288552 A1* | 9/2021 | Aboul-Magd | H04W 8/04 |
| 2021/0337594 A1* | 10/2021 | Xin | H04W 74/0808 |
| 2021/0385878 A1* | 12/2021 | del Carpio Vega | H04W 72/0446 |

(Continued)

*Primary Examiner* — Robert J Lopata
(74) *Attorney, Agent, or Firm* — Eversheds Sutherland (US) LLP

(57) ABSTRACT

This disclosure describes systems, methods, and devices related to enhanced traffic model. A device may maintain, at an upper layer, a self-ordering queue associated with one or more time sensitive packets associated with times sensitive traffic streams. The device may transmit the one or more time sensitive packets from the self-ordering queue to a TSN queue at a lower layer. The device may control one or more enhanced distributed channel access (EDCA) queues by using a control function. The device may transmit the one or more time sensitive packets to a first station device.

16 Claims, 13 Drawing Sheets

(56) References Cited

U.S. PATENT DOCUMENTS

| | | | |
|---|---|---|---|
| 2022/0167373 A1* | 5/2022 | Lin | H04W 72/569 |
| 2022/0272580 A1* | 8/2022 | Kim | H04L 1/00 |
| 2023/0104897 A1* | 4/2023 | Kishida | H04L 47/24 |
| | | | 370/329 |
| 2023/0140487 A1* | 5/2023 | Kishida | H04W 74/0816 |
| | | | 370/329 |

* cited by examiner

| Priority | UP (Same as IEEE 802.1 D User Priority) | IEEE 802.1D Designation | AC | Transmit Queue (Dot11 Alternate-EDCA Activated False or Not Present) | Transmit Queue (Dot11 Alternate-EDCA Activated True) | Designation (M138) |
|---|---|---|---|---|---|---|
| Lowest | 1 | BK | AC_BK | BK | BK | Backgroud |
| ↓ | 2 | - | AC_BK | BK | BK | Backgroud |
|  | 0 | BE | AC_BE | BE | BE | Best Effort |
|  | 3 | EE | AC_BE | BE | BE | Best Effort |
|  | 4 | CL | AC_VI | VI | A_VI | Video (Alternate) |
|  | 5 | VI | AC_VI | VI | VI | Video (Primary) |
|  | 6 | VO | AC_VO | VO | VO | Voice (Primary) |
| Highest | 7 | NC | AC_VO | VO | A_VO | Voice (Alternate) |
| → | 8 | TS | AC_TS | TS | TS | LLS Stream |
|  | 9 |  | AC_TS | TS | TS | LLS Stream |
|  | 10 |  | AC_TS | TS | TS | LLS Stream |
|  | 11 |  | AC_TS | TS | TS | LLS Stream |
|  | 12 | P2P | - | - | - | - |
|  | 13-15 | TBD | - | - | - | - |

Update to Map to AC_BE (applies to Background, Background, Best Effort, Best Effort rows)

Up to 4 Low Latency Streams with Specific QOS Requirements, e.g., ProAV, Vision-Based Robotic Control, AMRs, Industrial Automation, Priority Service,... (applies to LLS Stream rows)

New TID to AC_TS Mapping

| Element ID | Length | DSCP Exception List | UP0 DSCP Range | UP1 DSCP Range | ... | UP7 DSCP Range | DSCP Range for UPs>7 | TID-to-AC Mapping for TIDs>7 |

FIG. 6

QOS MODEL FOR SUPPORTING LOW LATENCY SERVICES AND TIME-SENSITIVE NETWORKING

CROSS-REFERENCE TO RELATED APPLICATION(S)

This application claims the benefit of U.S. Provisional Application No. 63/032,988, filed Jun. 1, 2020, the disclosure of which is incorporated herein by reference as if set forth in full.

TECHNICAL FIELD

This disclosure generally relates to systems and methods for wireless communications and, more particularly, to an enhanced traffic model for supporting low latency services and time-sensitive networking (TSN).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 5 depicts an illustrative schematic diagram for enhanced traffic model, in accordance with one or more example embodiments of the present disclosure.

FIG. 6 depicts an illustrative schematic diagram for enhanced traffic model, in accordance with one or more example embodiments of the present disclosure.

DETAILED DESCRIPTION

Figure 1:
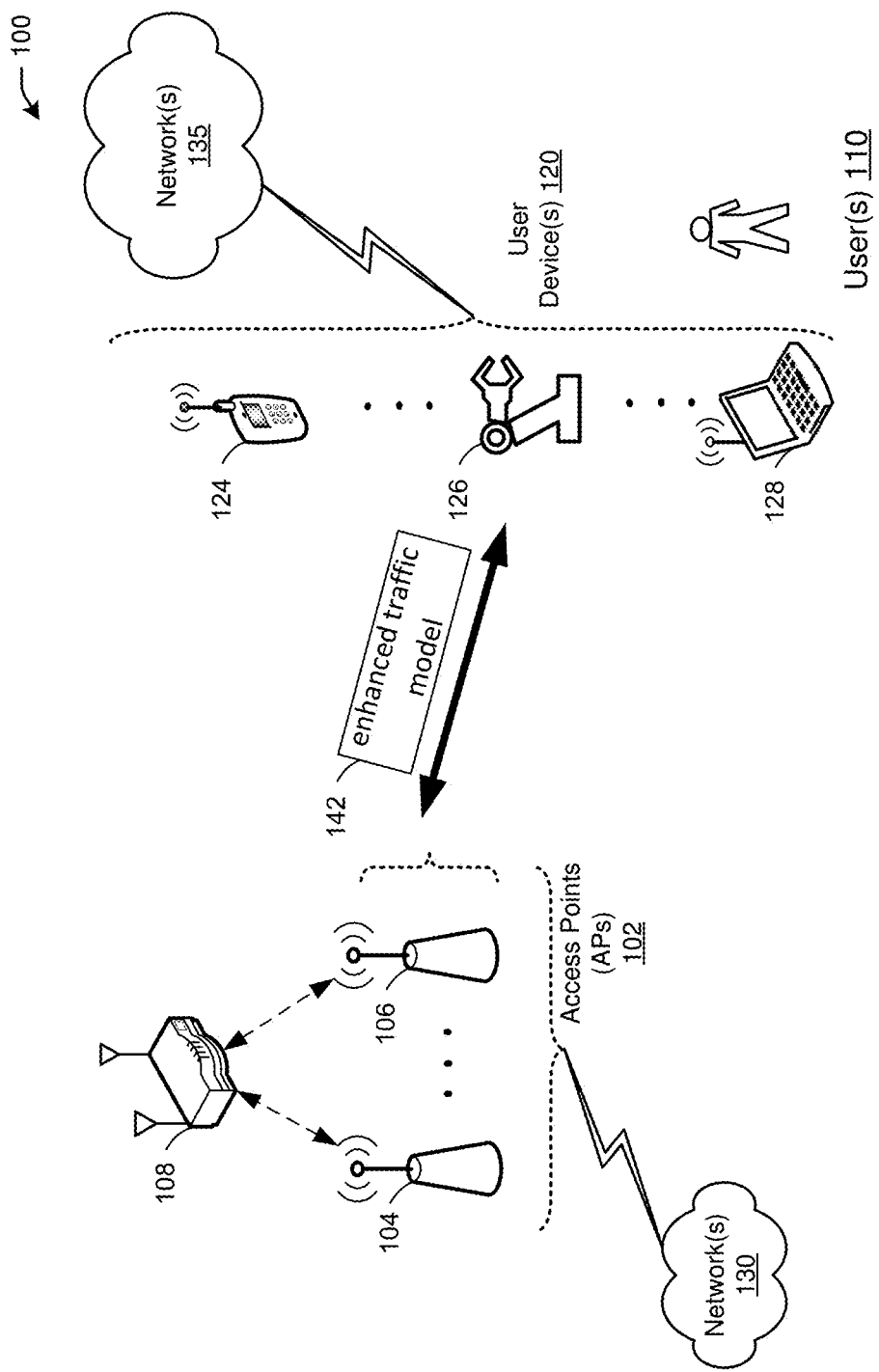
FIG. 1 is a network diagram illustrating an example network environment for enhanced traffic model, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

One challenge for next-generation Wi-Fi technology is to support Time-Sensitive Networking (TSN) and Real-Time applications (RTA), which require low bounded latency and jitter with high reliability. Defining better support for TSN and RTA application are part of the scope of the next generation Wi-Fi being developed by the 802.11be task group.

Although enhanced distributed channel access (EDCA) has worked well in the last 15 years for voice and video applications, which are the major wireless applications in the market today that need quality of service (QoS) support, the same model does not capture the requirements of emerging time-sensitive applications that may become more important in the future. It is well understood that new time-sensitive applications, such as gaming, augmented reality (AR)/virtual reality (VR), industrial automation, robotics will need worst case latency guarantees for individual packets (e.g. user command during a game or an action to actuate a robot). Therefore, average priorities that work for voice and video are not enough for future applications.

Current EDCA implementation uses first in first out (FIFO) queues, which do not enable packet transmission prioritization based on deadlines or other criteria but instead are only implemented based on which packet is in and which packet is out.

New time-sensitive applications will require multiple time-sensitive traffic streams in the same device (access point (AP), station device (STA)) with potentially different timing requirements and worst-case latency deadlines. The EDCA enhanced traffic model and its implementation need to be more flexible to support a time-sensitive access category that can be used by multiple streams with different timing requirements/deadlines. When data packets with different deadlines reach one of the medium access control (MAC) queues, in order to ensure their delivery deadlines are met, re-ordering operations are required, which is not feasible in current 802.11 MAC implementations.

Trigger-based access enabled scheduled operation in 802.11ax can help schedule and provide a low latency service, but EDCA can still influence the ability of an Access Point (AP) to schedule time-critical traffic.

The concept of a dedicated time-sensitive queue has been introduced, but no mechanisms exist to handle multiple traffic streams with different timing requirements mapped to a single time sensitive access category.

Example embodiments of the present disclosure relate to systems, methods, and devices for an enhanced traffic model for supporting low latency services and time-sensitive networking (TSN) over 802.11be.

In one embodiment, an enhanced traffic model system may facilitate a new architecture, protocol enhancements and implementation methods to enable multiple time-sensitive traffic streams to be mapped to a single enhanced distributed channel access (EDCA) access category and be delivered according to multiple, potentially different, deadlines. Some of the components include:

- An enhanced EDCA model with a higher layer re-ordering queue that enables multiple traffic streams to share a single EDCA FIFO queue and still be transmitted according to different time priorities/deadlines; and
- A flexible EDCA model and implementation with support for multiple traffic streams with heterogeneous requirements (deadlines) over a time-sensitive access category.

In one embodiment, an enhanced traffic model system may enable 802.11be networks to provide bounded latency and jitter with high reliability for multiple applications with potentially different requirements. This capability is expected to be one of the main new features in 802.11be and will enable TSN services and ultra-reliable low latency communications (URLLC) over 802.11be.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of enhanced traffic model, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
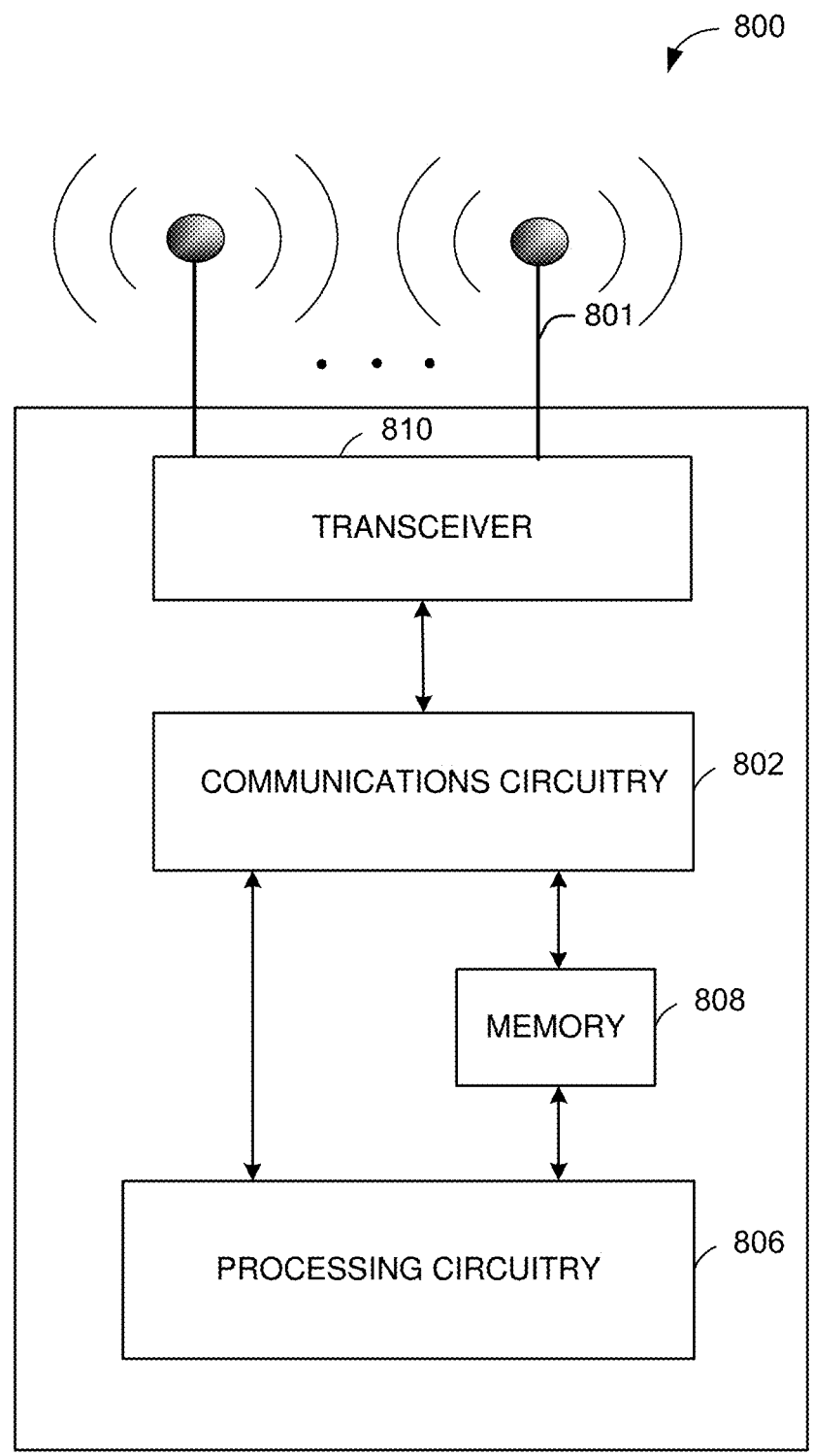
FIG. 8 illustrates a functional diagram of an exemplary communication station that may be suitable for use as a user device, in accordance with one or more example embodiments of the present disclosure.
Figure 9:
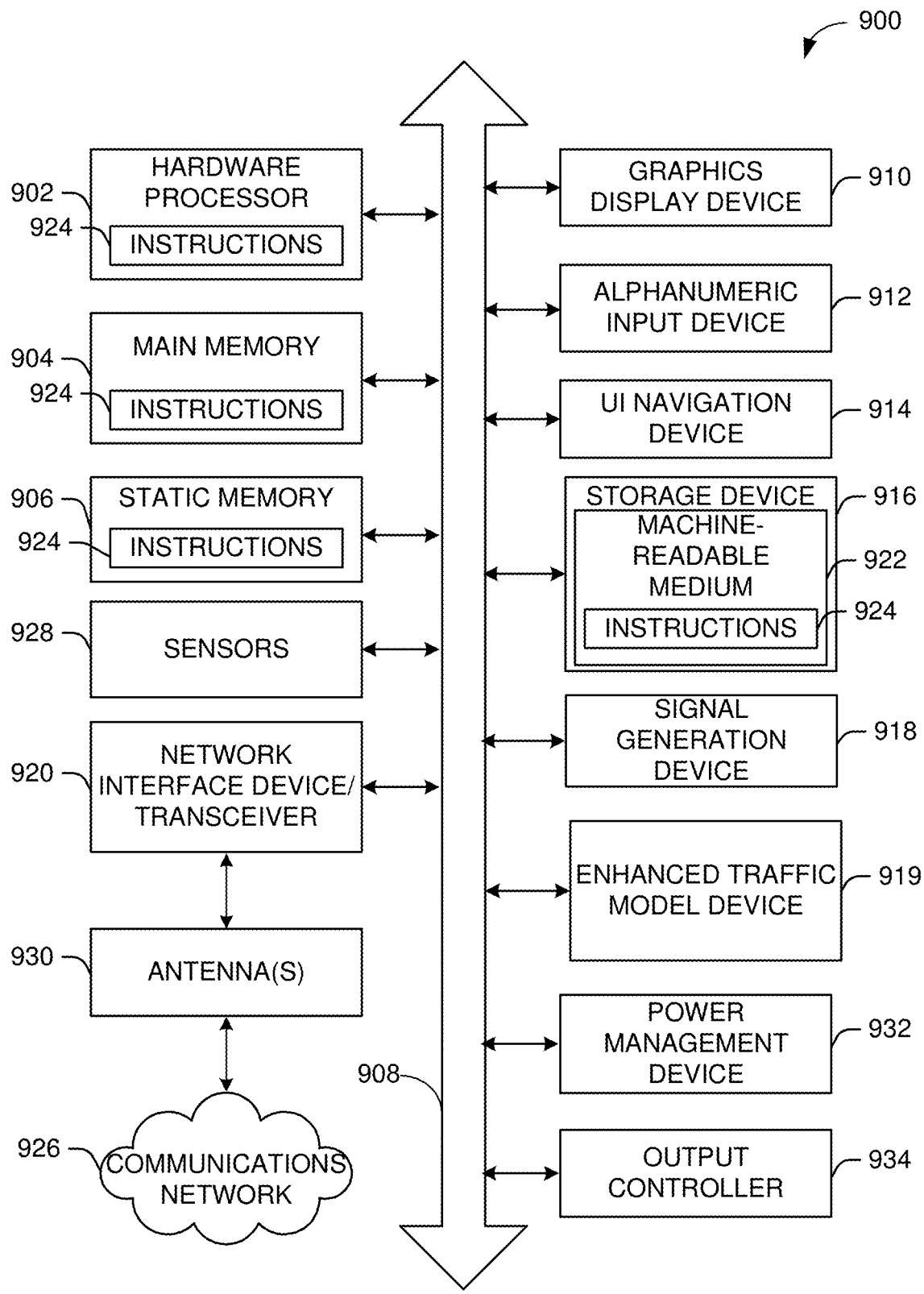
FIG. 9 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

In one or more embodiments, a controller 108 (e.g., a wireless TSN controller) may facilitate enhanced coordination among multiple APs (e.g., AP 104 and AP 106). The controller 108 may be a central entity or another AP, and may be responsible for configuring and scheduling time sensitive control and data operations across the APs. A wireless TSN (WTSN) management protocol may be used to facilitate enhanced coordination between the APs, which may be referred to as WTSN management clients in such context. The controller 108 may enable device admission control (e.g., control over admitting devices to a WTSN), joint scheduling, network measurements, and other operations. APs may be configured to follow the WTSN protocol.

In one or more embodiments, the use of controller 108 may facilitate AP synchronization and alignment for control and data transmissions to ensure latency with high reliability for time sensitive applications on a shared time sensitive data channel, while enabling coexistence with non-time sensitive traffic in the same network.

In one or more embodiments, the controller 108 and its coordination may be adopted in future Wi-Fi standards for new bands (e.g., 6-7 GHz), in which additional requirements of time synchronization and scheduled operations may be used. Such application of the controller 1 108 may be used in managed Wi-Fi deployments (e.g., enterprise, industrial, managed home networks, etc.) in which time sensitive traffic may be steered to a dedicated channel in existing bands as well as new bands.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate enhanced traffic model 142 with one or more user devices 120.

In one embodiment, the enhanced traffic model 142 may facilitate a new architecture, protocol enhancements and implementation methods to enable multiple time-sensitive traffic streams to be mapped to a single enhanced distributed channel access (EDCA) access category and be delivered according to multiple, potentially different, deadlines. Some of the components include:

An enhanced EDCA model with a higher layer re-ordering queue that enables multiple traffic streams to share a single EDCA FIFO queue and still be transmitted according to different time priorities/deadlines.

A flexible EDCA model and implementation with support for multiple traffic streams with heterogeneous requirements (deadlines) over a time-sensitive access category.

In one embodiment, the enhanced traffic model 142 may enable 802.11be networks to provide bounded latency and jitter with high reliability for multiple applications with potentially different requirements. This capability is expected to be one of the main new features in 802.11be and will enable TSN services and ultra-reliable low latency communications (URLLC) over 802.11be.

It is understood that the above descriptions are for purposes of illustration and are not meant to be limiting.

Figure 2:
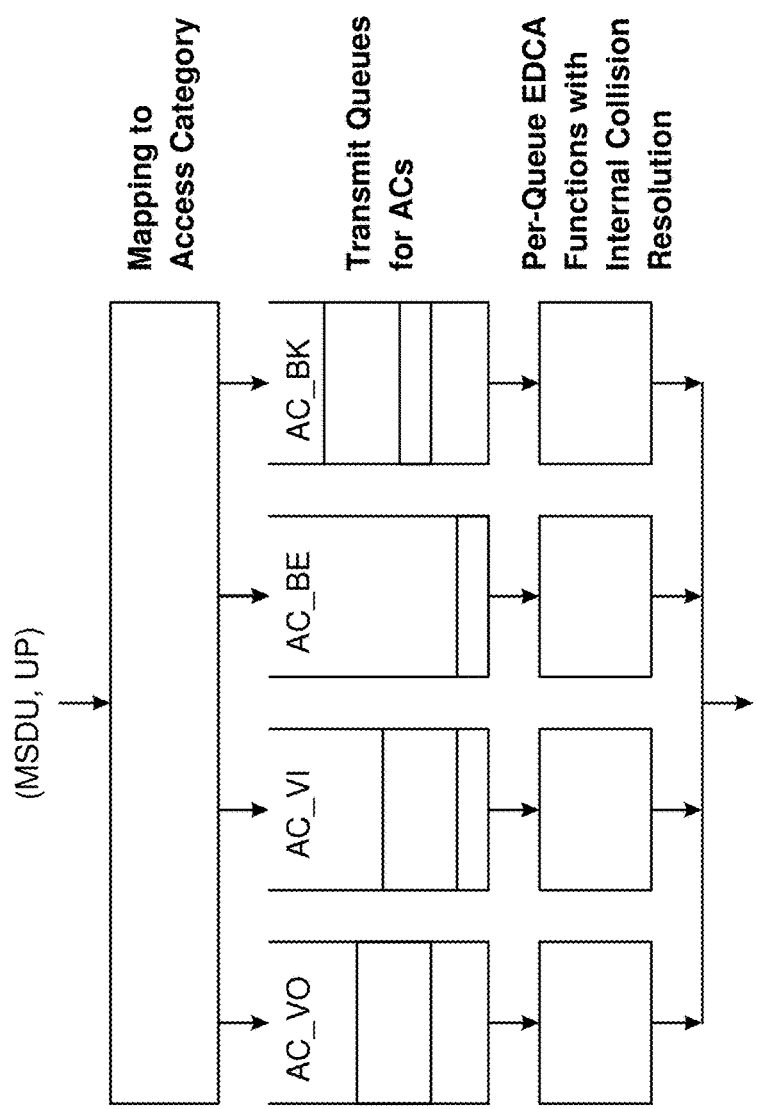
FIG. 2 depicts an illustrative schematic diagram for enhanced distributed channel access (EDCA) model, in accordance with one or more example embodiments of the present disclosure.

FIG. 2 depicts an illustrative schematic diagram 200 for enhanced distributed channel access (EDCA) model, in accordance with one or more example embodiments of the present disclosure.

Referring to FIG. 2, there is shown a worst-case latency problems in time-sensitive applications.

The 802.11e amendment (from 2005) defined the main QoS-specific enhancements to the 802.11 MAC, including the EDCA QoS model (shown in FIG. 2), which has become and still is the main mechanism for traffic prioritization in the 802.11 MAC. At the time of definition, voice and video were the main applications that drove the EDCA model design, which defined new access categories (AC_VO, AC_VI, AC_BE and AC_BK). On average, EDCA allows some access categories to get higher priority in accessing the channel (e.g. AC_VO and AC_VI have higher priority than AC_BE and AC_BK, which should be used for best effort and background traffic.

EDCA is a channel access method. With EDCA, high-priority traffic has a higher chance of being sent than low-priority traffic: a station with high priority traffic waits a little less before it sends its packet, on average, than a station with low priority traffic. The levels of priority in EDCA are called access categories (ACs). In addition, EDCA provides contention-free access to the channel for a period called a Transmit Opportunity (TXOP).

When an MAC service data unit (MSDU) arrives from an upper layer to the MAC layer of a device 202, the MSDU may first be mapped to one of four defined access categories (ACs) based at least in part on its user priority (UP). These four ACs include, in descending priority order, a voice (VO) access category, a video (VI) access category, a best effort (BE) access category, and a background (BK) access category. The MSDU is then routed to a transmit queue corresponding to the AC to which the MSDU has been mapped. Each such transmit queue may have a corresponding EDCA function (EDCAF), which may define a backoff window size, an arbitration interframe space (AIFS), and a transmission opportunity (TXOP) length for all MSDUs in the corresponding AC. An internal collision resolution scheme may resolve conflicts between the EDCAFs of different queues, and may, for example, allow an MSDU from a higher-priority queue to access the channel and defer an MSDU from a lower-priority queue when the two queues have backoff timers expire at substantially the same time.

In one or more embodiments, some assumptions are used in this disclosure:
1. Time-sensitive traffic stream: a higher layer traffic stream that has time-sensitive requirements including worst case latency and jitter.
2. Worst case latency: worst case latency required for delivering a data frame from MAC service access point (SAP) to MAC SAP, the data is not useful if it was delivered later than the worst-case latency. This may also be defined as a deadline for delivering the packet.
3. A Time Sensitive Access Category (TS_AC) is introduced to support time-sensitive traffic streams and a Time-Aware function is able to obtain scheduling information and deadlines for the traffic from higher layers.
4. The time-aware function is able to pause EDCA queues at specific time periods to avoid interference with the TS_AC queue's transmission schedule.

Figure 3:
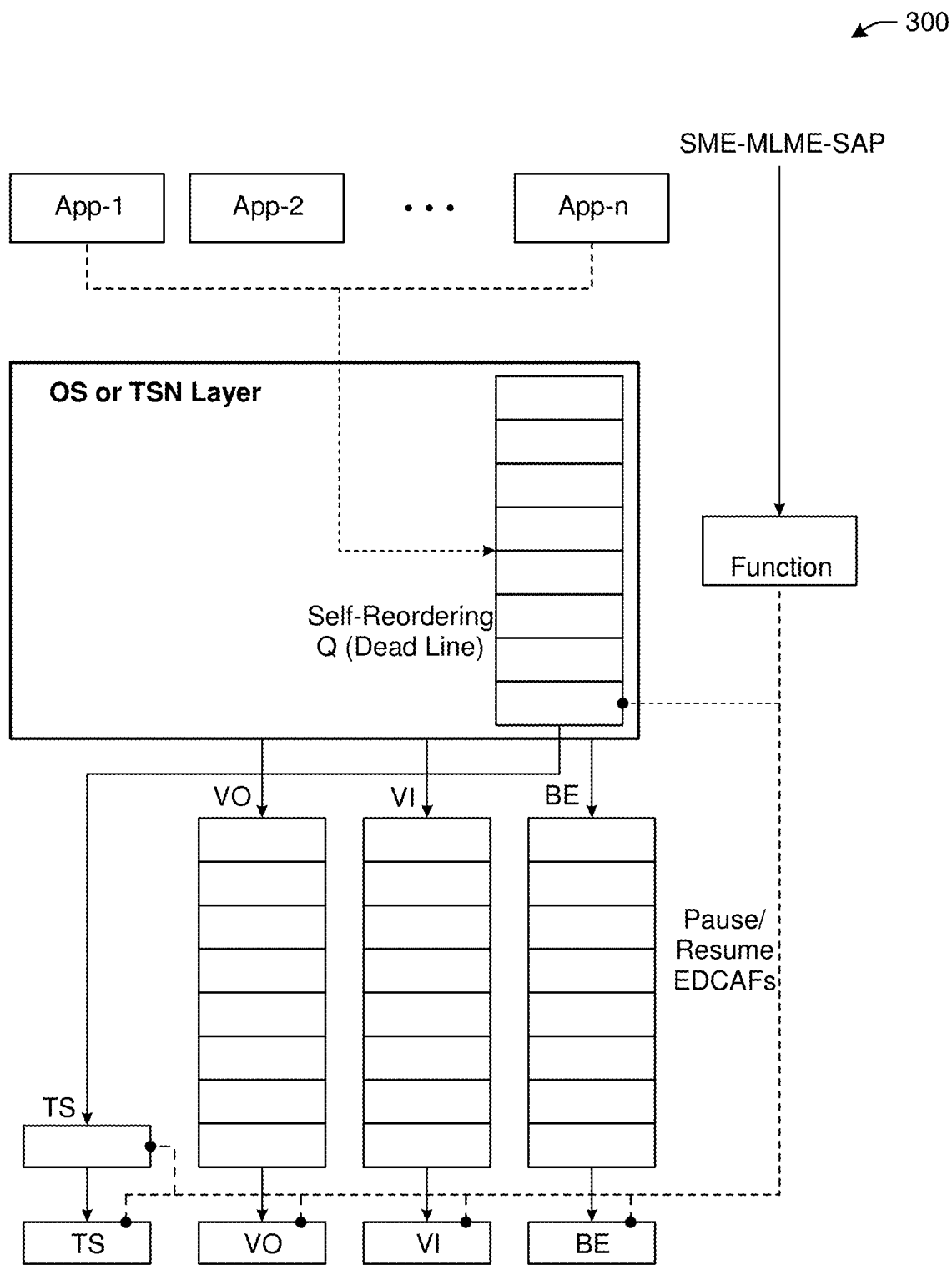
FIG. 3 depicts an illustrative schematic diagram for enhanced traffic model, in accordance with one or more example embodiments of the present disclosure.

FIG. 3 depicts an illustrative schematic diagram 300 for enhanced traffic model, in accordance with one or more example embodiments of the present disclosure.

Referring to FIG. 3, there is shown multiple time-sensitive streams support with TSN layer re-ordering queue.

In one or more embodiments, an enhanced traffic model may facilitate an enhanced EDCA model with higher layer re-ordering queue.

In one embodiment, the operating system (OS) or TSN Layer is responsible for maintaining an earliest-deadline-first ordered queue (self-ordering queue) that can ensure multiple traffic streams with different requirements can still have their packets delivered in the required order.

The higher layer self-ordering queue feeds the 802.11 Time-Sensitive (TS) Queue, which may hold one or more packets. When the TS_AC function gets access to the medium and other EDCA functions are paused by the time-aware function, the self-ordering queue copies one or more entry(ies) into the TS queue to be transmitted. The multiple packets (or slots) in the TS queue may also be aggregated. The number of slots in the TS Queue may be configurable based on the requirements of the applications and network conditions.

Figure 4:
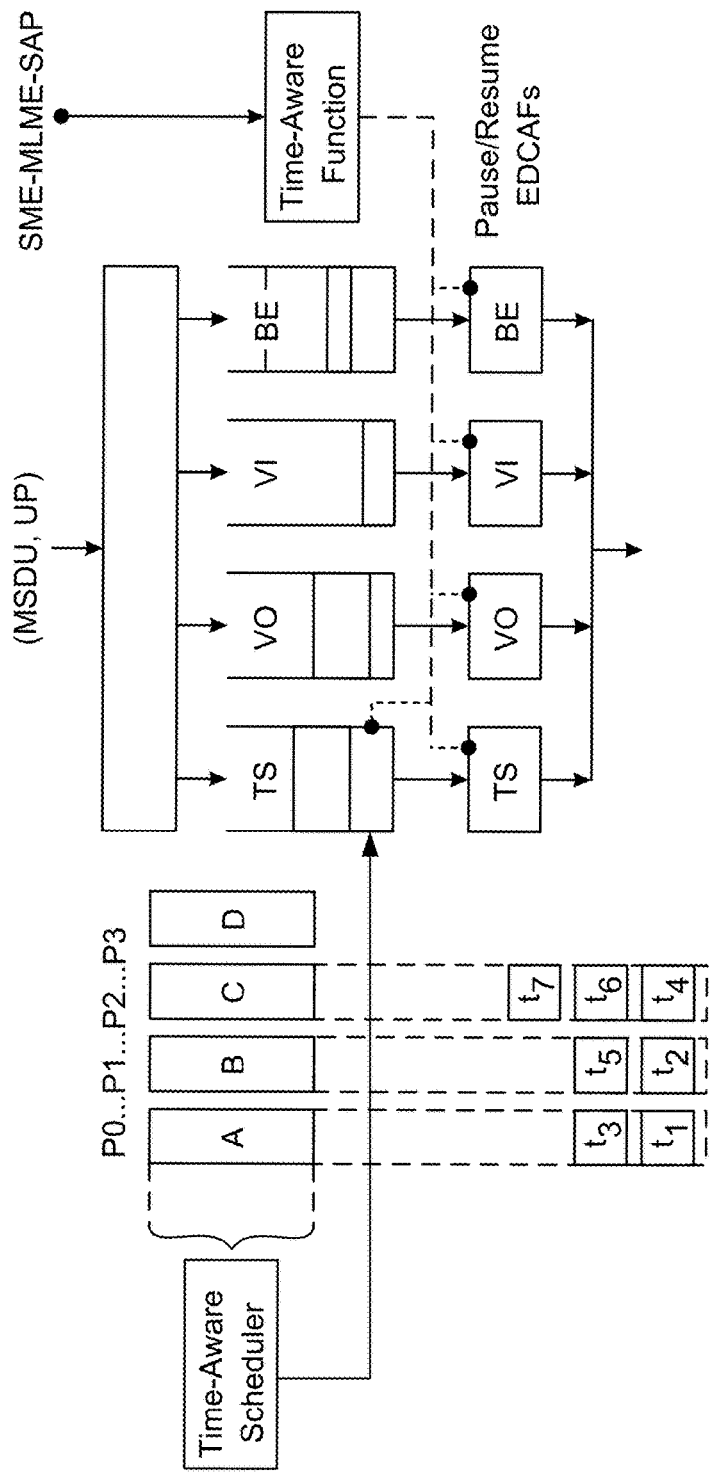
FIG. 4 depicts an illustrative schematic diagram for enhanced traffic model, in accordance with one or more example embodiments of the present disclosure.

FIG. 4 depicts an illustrative schematic diagram 400 for enhanced traffic model, in accordance with one or more example embodiments of the present disclosure.

Referring to FIG. 4, there is shown multiple time-sensitive streams support with MAC Layer Time-Aware Multiple Queues Scheduler.

In one or more embodiments, an enhanced traffic model system may facilitate a flexible EDCA model and implementation with support for multiple traffic streams with heterogeneous requirements over a time-sensitive access category.

In this case, multiple time-sensitive traffic streams with different requirements may be mapped directly onto the TS Queue at the 802.11 MAC. In one embodiment, the 802.11 MAC creates multiple internal queues (e.g. A, B, C and D in the FIG. 4) that are all associated with the same AC_TS, but which have different priorities (P0, P1, P2, and P3). The priorities will determine the order in which queues will be selected and frames will be transmitted when the AC_TS gets a transmission opportunity (TXOP) as indicated in the FIG. 4. The priorities may be defined according to different criteria (deadline based, round robin, strict priority, etc.).

FIG. 5 depicts an illustrative schematic diagram 500 for enhanced traffic model, in accordance with one or more example embodiments of the present disclosure.

Referring to FIG. 5, there is shown new TID(s) to AC mapping.

The mapping of the higher layer traffic streams to the multiple TS priority queues may be done using existing Traffic Identifiers (TID) or extensions of the TIDs defined in the 802.11 specification. Low latency stream (LLS) is associated with a traffic stream (TS) of the TSN TIDs. In this case, the TID subfield inside the QoS Info field of a Data frame may contain values greater than or equal to 8 corresponding to different stream IDs. Currently defined 8 traffic stream IDs (TSIDs 8-15) could be redefined in 802.11be as traffic identifiers (TIDs) as illustrated in FIG. 5. For example, TIDs 8-11 (4 TIDs) is defined for time-sensitive/low latency applications, one TID (say, TID 8) dedicated to a subset of timing/delay requirements that are different from another subset of timing/delay requirements defined for another TID (say, TID 9). Another example of a new set of TID definitions could be as follows:

TID 8-11: Time-sensitive applications;
TID 12: Peer-to-peer applications/packets;
TID 13: Prioritized services;
TID 14-15: Other applications/packets (e.g. gaming);

In one embodiment, the packets in TID 8-11 are queued in TS queue (as shown in FIG. 3 or FIG. 4). The packets with different values of TIDs (for example, TIDs 12-15) are queued in one of the existing queues (Vo, VI, or BE) as in FIG. 3.

FIG. 6 depicts an illustrative schematic diagram 600 for enhanced traffic model, in accordance with one or more example embodiments of the present disclosure.

Referring to FIG. 6, there is shown an example of extended DSCP-to-UP signaling.

Existing DSCP-to-UP mapping may be extended for new TID values 8-15 by either extending an existing element (e.g., the QoS Map element) or creating a new element with similar functionality. This signaling may be common or different for all links in the same MLD. The element could also be used to simultaneously/separately signal TID-to-AC mapping for the new TID values. FIG. 6 shows an example of an extended QoS Map element.

The QoS Map element may also indicate the multi-link device (MLD) identifier (ID) or a bitmap of ordered MLD IDs for each of the User Priority (UP) to differentiated services code point (DSCP) Range fields. For example, UP0DSCP Range field follows an MLD ID/ID Bitmap to indicate that packets with value UP 0 mapped to corresponding DSCP range is assigned to an MLD with MLD ID value in the following field. A similar MLD ID/ID Bitmap following UP1DSCP Range field would indicate that packets that are mapped with UP 1 are assigned to MLD with identifier indicated in the following field.

In one embodiment, the time-aware function can be different for different generation of Wi-Fi products. Release 1 802.11be clients may only support a rudimentary time-aware function that pauses all EDCA queues based on some signaling from the AP; the AC_TS queue may not even be present for such devices. On the other hand, the release 2 802.11be Wi-Fi products may support more detailed time-aware functions along with the presence of AC_TS queue. This allows an 11be release 2 AP to achieve prioritized transmissions in DL and UL without suffering due to contention from release 1 11be clients by pausing the latter during such periods of prioritized transmissions. For example, the release 1 clients may only support for one or more of the following:

1. Ability to receive signaling from the AP informing the latter of when to pause and resume backoff countdown for one or more of its EDCAFs. The signaling can be in a broadcast or unicast frame. The signaling may consist of specific schedule information or a simple time duration for which the STA is to pause all backoff.
2. Ability to receive a signal from higher layers within the device about when to pause and resume backoff countdown for one or more of its EDCAFs.
3. The signaling could be cross-link i.e., a signaling in link 1 to resume/pause EDCAFs in link 2.

In another embodiment the stream identifier may be carried in a different A-Ctrl field inside the Data frame.

In order to use the capabilities enabled by this solution, each time-sensitive traffic stream owner (transmitter) must negotiate a guaranteed level of service (GLS) with the receiving end (receiver). The GLS, is a requirement for time that the service has to be performed. The negotiation procedure may include the following steps:

1. Transmitter to publish capabilities of window size for GLS, which defines the maximum number of frames that can be held in the priority queue.
2. If the Recipient accepts it and declares block acknowledgment (BA) window (WIN) size, in time, equal or smaller, then GLS can be assured.
3. If recipient declines it and declares BA WIN size bigger than GLS, then the scheduling algorithm is defined as best-effort using head-of-queue peek abilities of up to WIN size (can assure GLS only for head of queue).

In one embodiment an AP multi-link device (MLD) can consist of virtual access points (VAPs), all of which together supports the TSN/low latency service. It is possible that another MLD(s) is collocated with such an MLD where each consisting VAP supports a different service (e.g., AR/VR). This would allow STAs that require different aggregate services to set up multi-link operations with a STA.

In the case of BA window>GLS, the resources allocation can be optimized for each queue.

The Scheduling function can implement several mechanisms to optimize its algorithm such as adaption to STA rate adaption or triggering AP, dropping or deferring frames to avoid blocking etc.

Figure 7:
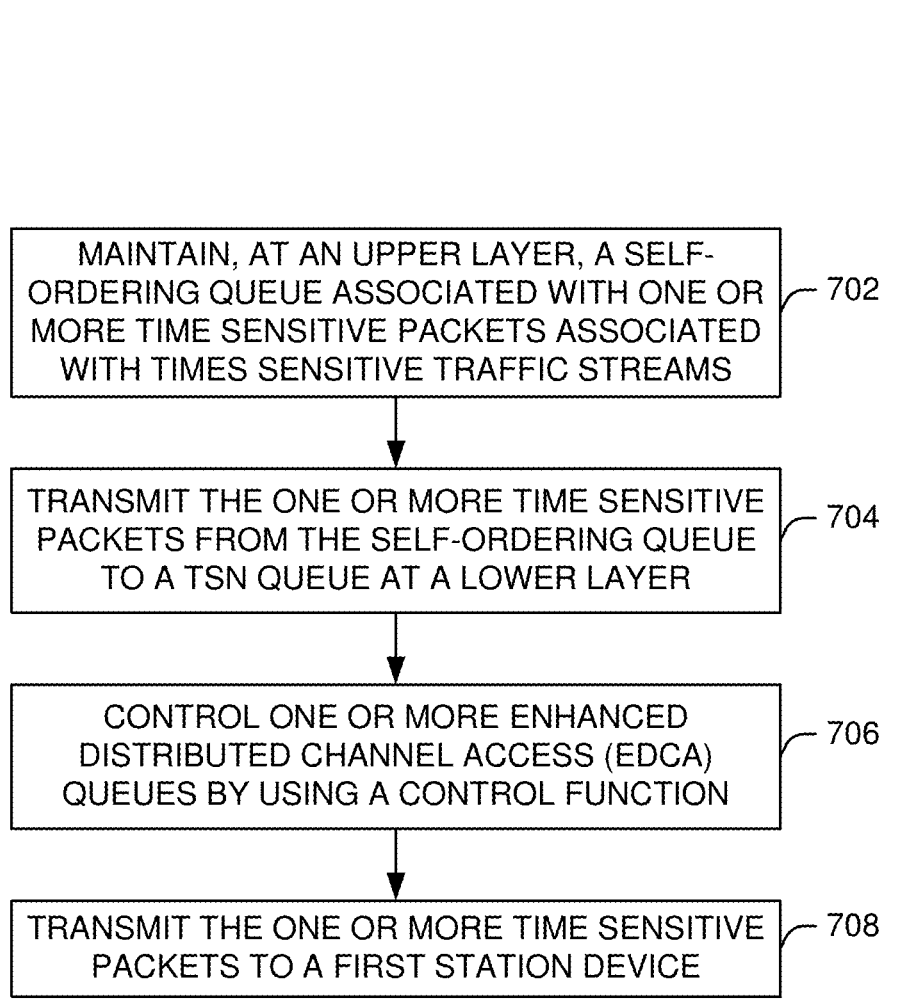
FIG. 7 illustrates a flow diagram of illustrative process for an illustrative enhanced traffic model system, in accordance with one or more example embodiments of the present disclosure.

FIG. 7 illustrates a flow diagram of illustrative process 700 for an enhanced traffic model system, in accordance with one or more example embodiments of the present disclosure.

At block 702, a device (e.g., the user device(s) 120 and/or the AP 102 of FIG. 1) may maintain, at an upper layer, a self-ordering queue associated with one or more time sensitive packets associated with times sensitive traffic streams. The upper layer may be an operating system or a TSN layer and wherein the lower layer is a MAC layer. The device may be an AP MLD comprised of a plurality of APs, and wherein the first station device is a non-AP MLD comprised of a plurality of STAs.

At block 704, the device may transmit the one or more time sensitive packets from the self-ordering queue to a TSN queue at a lower layer. The one or more time sensitive packets may be ordered based on deadline.

At block 706, the device may control one or more enhanced distributed channel access (EDCA) queues by using a control function. Controlling the one or more EDCA queues comprises pausing the one or more EDCA queues to allow the TSN queue to process the one or more time sensitive packets.

At block 708, the device may transmit the one or more time sensitive packets to a first station device. A quality of service (QoS) map element included in a data frame associated with the one or more time sensitive packets indicates a multi-link device (MLD) identifier (ID) or a bitmap of ordered MLD IDs. The device of claim 2, wherein the QoS map element indicates that packets with value user priority (UP) 0 mapped to corresponding differentiated services code point (DSCP) range is assigned to an MLD. The device may establish a first link between a first AP of the plurality of APs and a first STA of the plurality of STAs, wherein packets transmitted on the first link are associated with a first priority. The device may establish a second link between a second AP of the plurality of APs and a second STA of the plurality of STAs, wherein packets transmitted on the second link are associated with a second priority. The TSN queue at the lower layer is comprised of multiple internal queues that are grouped based on priorities. The priorities are based on deadline of a packet; round robin, or strict priority.

It is understood that the above descriptions are for purposes of illustration and are not meant to be limiting.

FIG. 8 shows a functional diagram of an exemplary communication station 800, in accordance with one or more example embodiments of the present disclosure. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in the above figures, diagrams, and flows.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an enhanced traffic model device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 902 for generation and processing of the baseband signals and for controlling operations of the main memory 904, the storage device 916, and/or the enhanced traffic model device 919. The baseband processor may be provided on a single radio card, a single chip, or an integrated circuit (IC).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The enhanced traffic model device 919 may carry out or perform any of the operations and processes (e.g., process 700) described and shown above.

It is understood that the above are only a subset of what the enhanced traffic model device 919 may be configured to perform and that other functions included throughout this disclosure may also be performed by the enhanced traffic model device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 10:
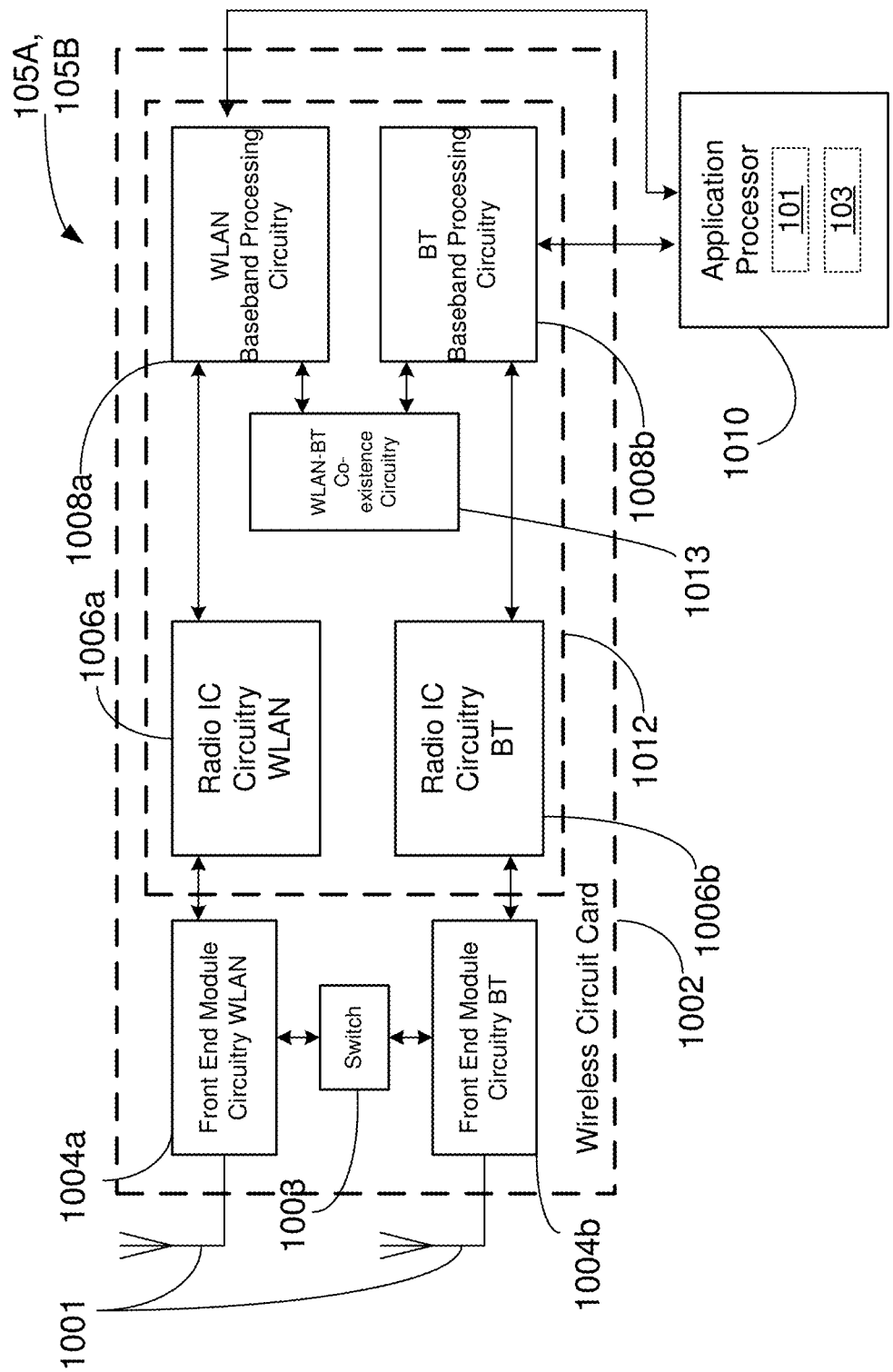
FIG. 10 is a block diagram of a radio architecture in accordance with some examples.

FIG. 10 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 1004a-b, radio IC circuitry 1006a-b and baseband processing circuitry 1008a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004a-b may include a WLAN or Wi-Fi FEM circuitry 1004a and a Bluetooth (BT) FEM circuitry 1004b. The WLAN FEM circuitry 1004a may include a receive signal path comprising circuitry configured to operate on WLAN RF signals received from one or more antennas 1001, to amplify the received signals and to provide the amplified versions of the received signals to the WLAN radio IC circuitry 1006a for further processing. The BT FEM circuitry 1004b may include a receive signal path which may include circuitry configured to operate on BT RF signals received from one or more antennas 1001, to amplify the received signals and to provide the amplified versions of the received signals to the BT radio IC circuitry 1006b for further processing. FEM circuitry 1004a may also include a transmit signal path which may include circuitry configured to amplify WLAN signals provided by the radio IC circuitry 1006a for wireless transmission by one or more of the antennas 1001. In addition, FEM circuitry 1004b may also include a transmit signal path which may include circuitry configured to amplify BT signals provided by the radio IC circuitry 1006b for wireless transmission by the one or more antennas. In the embodiment of FIG. 10, although FEM 1004a and FEM 1004b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006a-b as shown may include WLAN radio IC circuitry 1006a and BT radio IC circuitry 1006b. The WLAN radio IC circuitry 1006a may include a receive signal path which may include circuitry to down-convert WLAN RF signals received from the FEM circuitry 1004a and provide baseband signals to WLAN baseband processing circuitry 1008a. BT radio IC circuitry 1006b may in turn include a receive signal path which may include circuitry to down-convert BT RF signals received from the FEM circuitry 1004b and provide baseband signals to BT baseband processing circuitry 1008b. WLAN radio IC circuitry 1006a may also include a transmit signal path which may include circuitry to up-convert WLAN baseband signals provided by the WLAN baseband processing circuitry 1008a and provide WLAN RF output signals to the FEM circuitry 1004a for subsequent wireless transmission by the one or more antennas 1001. BT radio IC circuitry 1006b may also include a transmit signal path which may include circuitry to up-convert BT baseband signals provided by the BT baseband processing circuitry 1008b and provide BT RF output signals to the FEM circuitry 1004b for subsequent wireless transmission by the one or more antennas 1001. In the embodiment of FIG. 10, although radio IC circuitries 1006a and 1006b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1008a-b may include a WLAN baseband processing circuitry 1008a and a BT baseband processing circuitry 1008b. The WLAN baseband processing circuitry 1008a may include a memory, such as, for example, a set of RAM arrays in a Fast Fourier Transform or Inverse Fast Fourier Transform block (not shown) of the WLAN baseband processing circuitry 1008a. Each of the WLAN baseband circuitry 1008a and the BT baseband circuitry 1008b may further include one or more processors and control logic to process the signals received from the corresponding WLAN or BT receive signal path of the radio IC circuitry 1006a-b, and to also generate corresponding WLAN or BT baseband signals for the transmit signal path of the radio IC circuitry 1006a-b. Each of the baseband processing circuitries 1008a and 1008b may further include physical layer (PHY) and medium access control layer (MAC) circuitry, and may further interface with a device for generation and processing of the baseband signals and for controlling operations of the radio IC circuitry 1006a-b.

Referring still to FIG. 10, according to the shown embodiment, WLAN-BT coexistence circuitry 1013 may include logic providing an interface between the WLAN baseband circuitry 1008a and the BT baseband circuitry 1008b to enable use cases requiring WLAN and BT coexistence. In addition, a switch 1003 may be provided between the WLAN FEM circuitry 1004a and the BT FEM circuitry 1004*b* to allow switching between the WLAN and BT radios according to application needs. In addition, although the antennas 1001 are depicted as being respectively connected to the WLAN FEM circuitry 1004*a* and the BT FEM circuitry 1004*b*, embodiments include within their scope the sharing of one or more antennas as between the WLAN and BT FEMs, or the provision of more than one antenna connected to each of FEM 1004*a* or 1004*b*.

In some embodiments, the front-end module circuitry 1004*a-b*, the radio IC circuitry 1006*a-b*, and baseband processing circuitry 1008*a-b* may be provided on a single radio card, such as wireless radio card 1002. In some other embodiments, the one or more antennas 1001, the FEM circuitry 1004*a-b* and the radio IC circuitry 1006*a-b* may be provided on a single radio card. In some other embodiments, the radio IC circuitry 1006*a-b* and the baseband processing circuitry 1008*a-b* may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1008*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
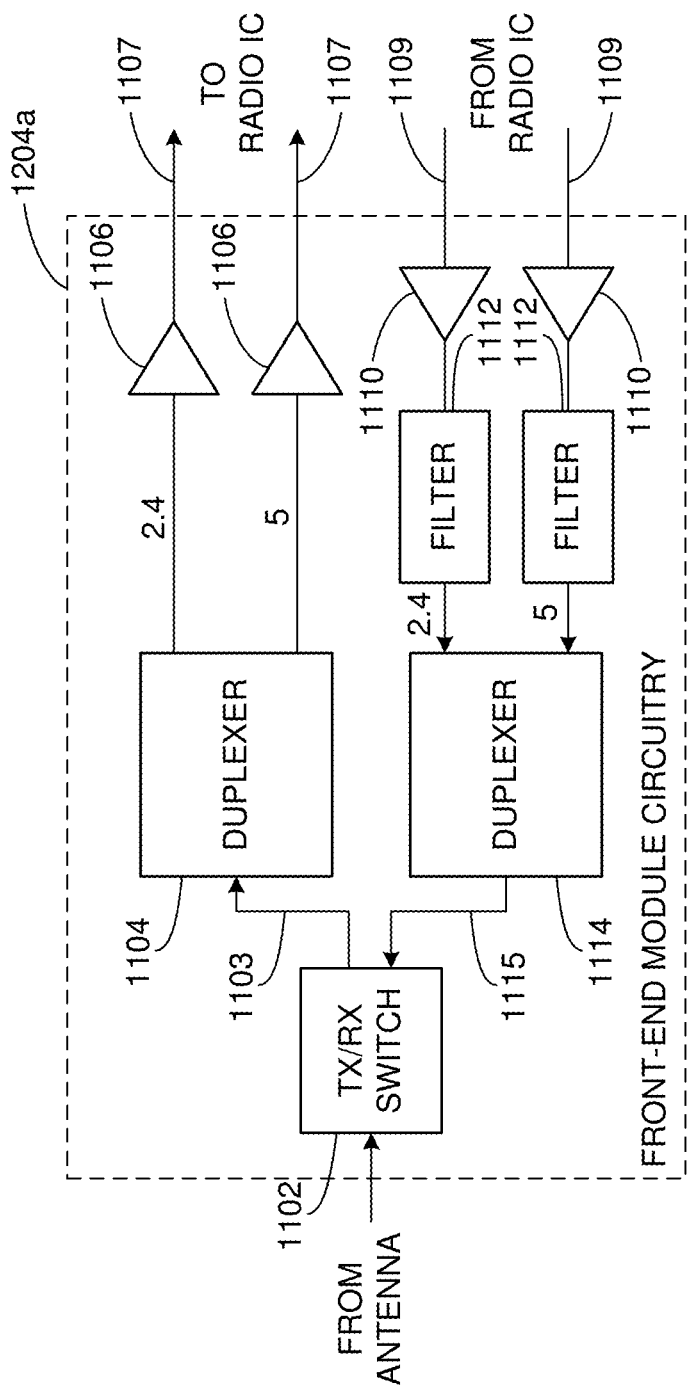
FIG. 11 illustrates an example front-end module circuitry for use in the radio architecture of FIG. 10, in accordance with one or more example embodiments of the present disclosure.

FIG. 11 illustrates WLAN FEM circuitry 1004*a* in accordance with some embodiments. Although the example of FIG. 11 is described in conjunction with the WLAN FEM circuitry 1004*a*, the example of FIG. 11 may be described in conjunction with the example BT FEM circuitry 1004*b* (FIG. 10), although other circuitry configurations may also be suitable.

In some embodiments, the FEM circuitry 1004*a* may include a TX/RX switch 1102 to switch between transmit mode and receive mode operation. The FEM circuitry 1004*a* may include a receive signal path and a transmit signal path. The receive signal path of the FEM circuitry 1004*a* may include a low-noise amplifier (LNA) 1106 to amplify received RF signals 1103 and provide the amplified received RF signals 1107 as an output (e.g., to the radio IC circuitry 1006*a-b* (FIG. 10)). The transmit signal path of the circuitry 1004*a* may include a power amplifier (PA) to amplify input RF signals 1109 (e.g., provided by the radio IC circuitry 1006*a-b*), and one or more filters 1112, such as band-pass filters (BPFs), low-pass filters (LPFs) or other types of filters, to generate RF signals 1115 for subsequent transmission (e.g., by one or more of the antennas 1001 (FIG. 10)) via an example duplexer 1114.

In some dual-mode embodiments for Wi-Fi communication, the FEM circuitry 1004*a* may be configured to operate in either the 2.4 GHz frequency spectrum or the 5 GHz frequency spectrum. In these embodiments, the receive signal path of the FEM circuitry 1004*a* may include a receive signal path duplexer 1104 to separate the signals from each spectrum as well as provide a separate LNA 1106 for each spectrum as shown. In these embodiments, the transmit signal path of the FEM circuitry 1004*a* may also include a power amplifier 1110 and a filter 1112, such as a BPF, an LPF or another type of filter for each frequency spectrum and a transmit signal path duplexer 1104 to provide the signals of one of the different spectrums onto a single transmit path for subsequent transmission by the one or more of the antennas 1001 (FIG. 10). In some embodiments, BT communications may utilize the 2.4 GHz signal paths and may utilize the same FEM circuitry 1004*a* as the one used for WLAN communications.

Figure 12:
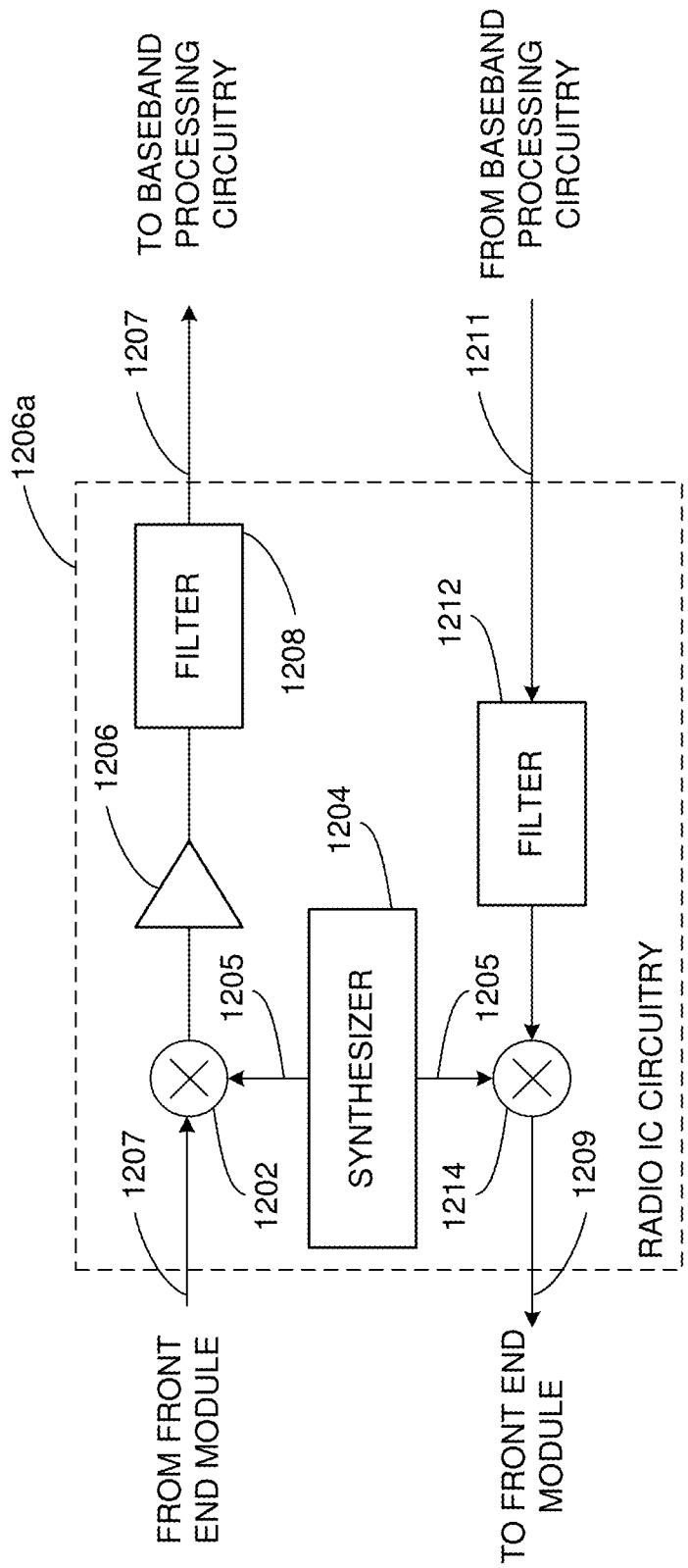
FIG. 12 illustrates an example radio IC circuitry for use in the radio architecture of FIG. 10, in accordance with one or more example embodiments of the present disclosure.

FIG. 12 illustrates radio IC circuitry 1006*a* in accordance with some embodiments. The radio IC circuitry 1006*a* is one example of circuitry that may be suitable for use as the WLAN or BT radio IC circuitry 1006*a*/1006*b* (FIG. 10), although other circuitry configurations may also be suitable. Alternatively, the example of FIG. 12 may be described in conjunction with the example BT radio IC circuitry 1006*b*.

In some embodiments, the radio IC circuitry 1006*a* may include a receive signal path and a transmit signal path. The receive signal path of the radio IC circuitry 1006*a* may include at least mixer circuitry 1202, such as, for example, down-conversion mixer circuitry, amplifier circuitry 1206 and filter circuitry 1208. The transmit signal path of the radio IC circuitry 1006a may include at least filter circuitry 1212 and mixer circuitry 1214, such as, for example, up-conversion mixer circuitry. Radio IC circuitry 1006a may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004a-b (FIG. 10) based on the synthesized frequency 1205 provided by synthesizer circuitry 1204. The amplifier circuitry 1206 may be configured to amplify the down-converted signals and the filter circuitry 1208 may include an LPF configured to remove unwanted signals from the down-converted signals to generate output baseband signals 1207. Output baseband signals 1207 may be provided to the baseband processing circuitry 1008a-b (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004a-b. The baseband signals 1211 may be provided by the baseband processing circuitry 1008a-b and may be filtered by filter circuitry 1212. The filter circuitry 1212 may include an LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1204 may be provided by a voltage controlled oscillator (VCO), although that is not a requirement. A divider control input may further be provided by either the baseband processing circuitry 1008a-b (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the example application processor 1010. The application processor 1010 may include, or otherwise be connected to, one of the example secure signal converter 101 or the example received signal converter 103 (e.g., depending on which device the example radio architecture is implemented in).

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
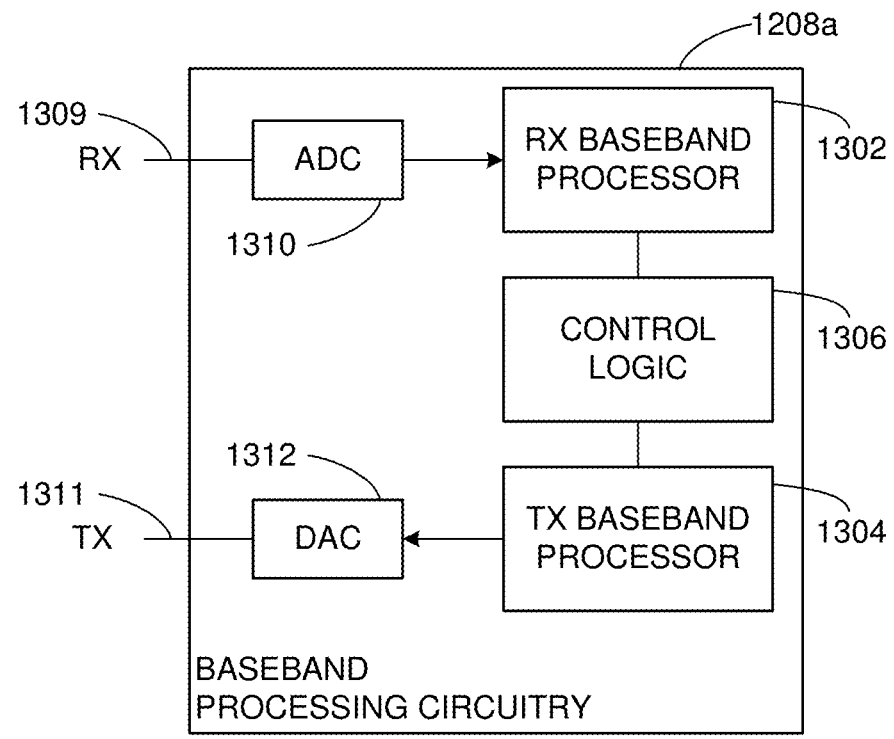
FIG. 13 illustrates an example baseband processing circuitry for use in the radio architecture of FIG. 10, in accordance with one or more example embodiments of the present disclosure.

FIG. 13 illustrates a functional block diagram of baseband processing circuitry 1008a in accordance with some embodiments. The baseband processing circuitry 1008a is one example of circuitry that may be suitable for use as the baseband processing circuitry 1008a (FIG. 10), although other circuitry configurations may also be suitable. Alternatively, the example of FIG. 12 may be used to implement the example BT baseband processing circuitry 1008b of FIG. 10.

The baseband processing circuitry 1008a may include a receive baseband processor (RX BBP) 1302 for processing receive baseband signals 1209 provided by the radio IC circuitry 1006a-b (FIG. 10) and a transmit baseband processor (TX BBP) 1304 for generating transmit baseband signals 1211 for the radio IC circuitry 1006a-b. The baseband processing circuitry 1008a may also include control logic 1306 for coordinating the operations of the baseband processing circuitry 1008a.

In some embodiments (e.g., when analog baseband signals are exchanged between the baseband processing circuitry 1008a-b and the radio IC circuitry 1006a-b), the baseband processing circuitry 1008a may include ADC 1310 to convert analog baseband signals 1309 received from the radio IC circuitry 1006a-b to digital baseband signals for processing by the RX BBP 1302. In these embodiments, the baseband processing circuitry 1008a may also include DAC 1312 to convert digital baseband signals from the TX BBP 1304 to analog baseband signals 1311.

In some embodiments that communicate OFDM signals or OFDMA signals, such as through baseband processor 1008a, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: maintain, at an upper layer, a self-ordering queue associated with one or more time sensitive packets associated with times sensitive traffic streams; transmit the one or more time sensitive packets from the self-ordering queue to a TSN queue at a lower layer; control one or more enhanced distributed channel access (EDCA) queues by using a control function; and transmit the one or more time sensitive packets to a first station device.

Example 2 may include the device of example 1 and/or some other example herein, wherein a quality of service (QoS) map element included in a data frame associated with the one or more time sensitive packets indicates a multi-link device (MLD) identifier (ID) or a bitmap of ordered MLD IDs.

Example 3 may include the device of example 2 and/or some other example herein, wherein the QoS map element indicates that packets with value user priority (UP) 0 mapped to corresponding differentiated services code point (DSCP) range may be assigned to an MLD.

Example 4 may include the device of example 1 and/or some other example herein, wherein to control the one or more EDCA queues comprises the processing circuitry further configured to pause the one or more EDCA queues to allow the TSN queue to process the one or more time sensitive packets.

Example 5 may include the device of example 1 and/or some other example herein, wherein the one or more time sensitive packets are ordered based on deadline.

Example 6 may include the device of example 1 and/or some other example herein, wherein the upper layer may be an operating system or a TSN layer and wherein the lower layer may be a MAC layer.

Example 7 may include the device of example 1 and/or some other example herein, wherein the TSN queue at the lower layer may be comprised of multiple internal queues that are grouped based on priorities.

Example 8 may include the device of example 7 and/or some other example herein, wherein the priorities are based on deadline of a packet; round robin, or strict priority.

Example 9 may include the device of example 1 and/or some other example herein, wherein the device may be an AP MLD comprised of a plurality of APs, and wherein the first station device may be a non-AP MLD comprised of a plurality of STAs.

Example 10 may include the device of example 9 and/or some other example herein, wherein the processing circuitry may be further configured to: establish a first link between a first AP of the plurality of APs and a first STA of the plurality of STAs, wherein packets transmitted on the first link are associated with a first priority; and establish a second link between a second AP of the plurality of APs and a second STA of the plurality of STAs, wherein packets transmitted on the second link are associated with a second priority.

Example 11 may include a non-transitory computer-readable medium storing computer-executable instructions which when executed by one or more processors result in performing operations comprising: maintaining, at an upper layer, a self-ordering queue associated with one or more time sensitive packets associated with times sensitive traffic streams; transmitting the one or more time sensitive packets from the self-ordering queue to a TSN queue at a lower layer; controlling one or more enhanced distributed channel access (EDCA) queues by using a control function; and transmitting the one or more time sensitive packets to a first station device.

Example 12 may include the non-transitory computer-readable medium of example 11 and/or some other example herein, wherein a quality of service (QoS) map element included in a data frame associated with the one or more time sensitive packets indicates a multi-link device (MLD) identifier (ID) or a bitmap of ordered MLD IDs.

Example 13 may include the non-transitory computer-readable medium of example 12 and/or some other example herein, wherein the QoS map element indicates that packets with value user priority (UP) 0 mapped to corresponding differentiated services code point (DSCP) range may be assigned to an MLD.

Example 14 may include the non-transitory computer-readable medium of example 11 and/or some other example herein, wherein controlling the one or more EDCA queues comprises the further operations for pausing the one or more EDCA queues to allow the TSN queue to process the one or more time sensitive packets.

Example 15 may include the non-transitory computer-readable medium of example 11 and/or some other example herein, wherein the one or more time sensitive packets are ordered based on deadline.

Example 16 may include the non-transitory computer-readable medium of example 11 and/or some other example herein, wherein the upper layer may be an operating system or a TSN layer and wherein the lower layer may be a MAC layer.

Example 17 may include the non-transitory computer-readable medium of example 11 and/or some other example herein, wherein the TSN queue at the lower layer may be comprised of multiple internal queues that are grouped based on priorities.

Example 18 may include the non-transitory computer-readable medium of example 17 and/or some other example herein, wherein the priorities are based on deadline of a packet; round robin, or strict priority.

Example 19 may include the non-transitory computer-readable medium of example 11 and/or some other example herein, wherein the device may be an AP MLD comprised of a plurality of APs, and wherein the first station device may be a non-AP MLD comprised of a plurality of STAs.

Example 20 may include the non-transitory computer-readable medium of example 11 and/or some other example herein, wherein the operations further comprise: establishing a first link between a first AP of the plurality of APs and a first STA of the plurality of STAs, wherein packets transmitted on the first link are associated with a first priority; and establishing a second link between a second AP of the plurality of APs and a second STA of the plurality of STAs, wherein packets transmitted on the second link are associated with a second priority.

Example 21 may include a method comprising: maintaining, at an upper layer, a self-ordering queue associated with one or more time sensitive packets associated with times sensitive traffic streams; transmitting the one or more time sensitive packets from the self-ordering queue to a TSN queue at a lower layer; controlling one or more enhanced distributed channel access (EDCA) queues by using a control function; and transmitting the one or more time sensitive packets to a first station device.

Example 22 may include the method of example 21 and/or some other example herein, wherein a quality of service (QoS) map element included in a data frame associated with the one or more time sensitive packets indicates a multi-link device (MLD) identifier (ID) or a bitmap of ordered MLD IDs.

Example 23 may include the method of example 22 and/or some other example herein, wherein the QoS map element indicates that packets with value user priority (UP) 0 mapped to corresponding differentiated services code point (DSCP) range may be assigned to an MLD.

Example 24 may include the method of example 21 and/or some other example herein, wherein to control the one or more EDCA queues comprises pausing the one or more EDCA queues to allow the TSN queue to process the one or more time sensitive packets.

Example 25 may include the method of example 21 and/or some other example herein, wherein the one or more time sensitive packets are ordered based on deadline.

Example 26 may include the method of example 21 and/or some other example herein, wherein the upper layer may be an operating system or a TSN layer and wherein the lower layer may be a MAC layer.

Example 27 may include the method of example 21 and/or some other example herein, wherein the TSN queue at the lower layer may be comprised of multiple internal queues that are grouped based on priorities.

Example 28 may include the method of example 27 and/or some other example herein, wherein the priorities are based on deadline of a packet; round robin, or strict priority.

Example 29 may include the method of example 21 and/or some other example herein, wherein the device may be an AP MLD comprised of a plurality of APs, and wherein the first station device may be a non-AP MLD comprised of a plurality of STAs.

Example 30 may include the method of example 29 and/or some other example herein, further comprising: establishing a first link between a first AP of the plurality of APs and a first STA of the plurality of STAs, wherein packets transmitted on the first link are associated with a first priority; and establishing a second link between a second AP of the plurality of APs and a second STA of the plurality of STAs, wherein packets transmitted on the second link are associated with a second priority.

Example 31 may include an apparatus comprising means for: maintaining, at an upper layer, a self-ordering queue associated with one or more time sensitive packets associated with times sensitive traffic streams; transmitting the one or more time sensitive packets from the self-ordering queue to a TSN queue at a lower layer; controlling one or more enhanced distributed channel access (EDCA) queues by using a control function; and transmitting the one or more time sensitive packets to a first station device.

Example 32 may include the apparatus of example 31 and/or some other example herein, wherein a quality of service (QoS) map element included in a data frame associated with the one or more time sensitive packets indicates a multi-link device (MLD) identifier (ID) or a bitmap of ordered MLD IDs.

Example 33 may include the apparatus of example 32 and/or some other example herein, wherein the QoS map element indicates that packets with value user priority (UP) 0 mapped to corresponding differentiated services code point (DSCP) range may be assigned to an MLD.

Example 34 may include the apparatus of example 31 and/or some other example herein, wherein to control the one or more EDCA queues comprises the means for pausing the one or more EDCA queues to allow the TSN queue to process the one or more time sensitive packets.

Example 35 may include the apparatus of example 31 and/or some other example herein, wherein the one or more time sensitive packets are ordered based on deadline.

Example 36 may include the apparatus of example 31 and/or some other example herein, wherein the upper layer may be an operating system or a TSN layer and wherein the lower layer may be a MAC layer.

Example 37 may include the apparatus of example 31 and/or some other example herein, wherein the TSN queue at the lower layer may be comprised of multiple internal queues that are grouped based on priorities.

Example 38 may include the apparatus of example 37 and/or some other example herein, wherein the priorities are based on deadline of a packet; round robin, or strict priority.

Example 39 may include the apparatus of example 31 and/or some other example herein, wherein the device may be an AP MLD comprised of a plurality of APs, and wherein the first station device may be a non-AP MLD comprised of a plurality of STAs.

Example 40 may include the apparatus of example 39 and/or some other example herein, further comprising: establishing a first link between a first AP of the plurality of APs and a first STA of the plurality of STAs, wherein packets transmitted on the first link are associated with a first priority; and establishing a second link between a second AP of the plurality of APs and a second STA of the plurality of STAs, wherein packets transmitted on the second link are associated with a second priority. Example 41 may include one or more non-transitory computer-readable media comprising instructions to cause an electronic device, upon execution of the instructions by one or more processors of the electronic device, to perform one or more elements of a method described in or related to any of examples 1-40, or any other method or process described herein.

Example 42 may include an apparatus comprising logic, modules, and/or circuitry to perform one or more elements of a method described in or related to any of examples 1-40, or any other method or process described herein.

Example 43 may include a method, technique, or process as described in or related to any of examples 1-40, or portions or parts thereof.

Example 44 may include an apparatus comprising: one or more processors and one or more computer readable media comprising instructions that, when executed by the one or more processors, cause the one or more processors to perform the method, techniques, or process as described in or related to any of examples 1-40, or portions thereof.

Example 45 may include a method of communicating in a wireless network as shown and described herein.

Example 46 may include a system for providing wireless communication as shown and described herein.

Example 47 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
maintain, at an upper layer, a self-ordering queue associated with one or more time sensitive packets associated with times sensitive traffic streams; wherein a quality of service (QoS) map element included in a data frame associated with the one or more time sensitive packets indicates a multi-link device (MLD) identifier (ID) or a bitmap of ordered MLD IDs, and wherein the QoS map element indicates that packets with value user priority (UP) 0 mapped to corresponding differentiated services code point (DSCP) range is assigned to an MLD;
transmit the one or more time sensitive packets from the self-ordering queue to a TSN queue at a lower layer;
control one or more enhanced distributed channel access (EDCA) queues by using a control function; and
transmit the one or more time sensitive packets to a first station device.

2. The device of claim 1, wherein to control the one or more EDCA queues comprises the processing circuitry further configured to pause the one or more EDCA queues to allow the TSN queue to process the one or more time sensitive packets.

3. The device of claim 1, wherein the one or more time sensitive packets are ordered based on deadline.

4. The device of claim 1, wherein the upper layer is an operating system or a TSN layer and wherein the lower layer is a MAC layer.

5. The device of claim 1, wherein the TSN queue at the lower layer is comprised of multiple internal queues that are grouped based on priorities.

6. The device of claim 5, wherein the priorities are based on deadline of a packet; round robin, or strict priority.

7. The device of claim 1, wherein the device is an AP MLD comprised of a plurality of APs, and wherein the first station device is a non-AP MLD comprised of a plurality of STAs.

8. The device of claim 7, wherein the processing circuitry is further configured to:
establish a first link between a first AP of the plurality of APs and a first STA of the plurality of STAs, wherein packets transmitted on the first link are associated with a first priority; and
establish a second link between a second AP of the plurality of APs and a second STA of the plurality of STAs, wherein packets transmitted on the second link are associated with a second priority.

9. A non-transitory computer-readable medium storing computer-executable instructions which when executed by one or more processors result in performing operations comprising:
maintaining, at an upper layer, a self-ordering queue associated with one or more time sensitive packets associated with times sensitive traffic streams; wherein a quality of service (QoS) map element included in a data frame associated with the one or more time sensitive packets indicates a multi-link device (MLD) identifier (ID) or a bitmap of ordered MLD IDs, and wherein the QoS map element indicates that packets with value user priority (UP) 0 mapped to corresponding differentiated services code point (DSCP) range is assigned to an MLD;
transmitting the one or more time sensitive packets from the self-ordering queue to a TSN queue at a lower layer;
controlling one or more enhanced distributed channel access (EDCA) queues by using a control function; and
transmitting the one or more time sensitive packets to a first station device.

10. The non-transitory computer-readable medium of claim 9, wherein controlling the one or more EDCA queues comprises the further operations for pausing the one or more EDCA queues to allow the TSN queue to process the one or more time sensitive packets.

11. The non-transitory computer-readable medium of claim 9, wherein the one or more time sensitive packets are ordered based on deadline.

12. The non-transitory computer-readable medium of claim 9, wherein the upper layer is an operating system or a TSN layer and wherein the lower layer is a MAC layer.

13. The non-transitory computer-readable medium of claim 9, wherein the TSN queue at the lower layer is comprised of multiple internal queues that are grouped based on priorities.

14. The non-transitory computer-readable medium of claim 13, wherein the priorities are based on deadline of a packet; round robin, or strict priority.

15. The non-transitory computer-readable medium of claim 9, wherein the device is an AP MLD comprised of a plurality of APs, and wherein the first station device is a non-AP MLD comprised of a plurality of STAs.

16. A method comprising:
maintaining, at an upper layer, a self-ordering queue associated with one or more time sensitive packets associated with times sensitive traffic streams; wherein a quality of service (QoS) map element included in a data frame associated with the one or more time sensitive packets indicates a multi-link device (MLD) identifier (ID) or a bitmap of ordered MLD IDs, and wherein the QoS map element indicates that packets with value user priority (UP) 0 mapped to corresponding differentiated services code point (DSCP) range is assigned to an MLD;
transmitting the one or more time sensitive packets from the self-ordering queue to a TSN queue at a lower layer;
controlling one or more enhanced distributed channel access (EDCA) queues by using a control function; and
transmitting the one or more time sensitive packets to a first station device.

* * * * *